United States Patent Office
3,809,683
Patented May 7, 1974

3,809,683
PREPARATION OF POLYMERS
Edward Emil Schmitt, Norwalk, Conn., and Rocco Albert Polistina, Port Chester, N.Y., assignors to American Cyanamid Company, Stamford, Conn.
No Drawing. Filed Feb. 16, 1973, Ser. No. 333,432
Int. Cl. C08g 33/04
U.S. Cl. 260—78.4 N          7 Claims

ABSTRACT OF THE DISCLOSURE

Biodegradable aminotriazole polymers which are produced from dihydrazides are disclosed.

BACKGROUND OF THE INVENTION

The production of polymeric materials which are biodegradable i.e. they can be decomposed by biological action, within 1 year after implantation has recently become of increased importance. These polymers are useful for many applications, especially in the medical field where biodegradability is required. For example, in the treatment of minor or major wounds, sutures which degrade after a relatively short time are more advantageous, especially in regard to subdermal suturing.

Homopolymers of aliphatic dihydrazides are known to those skilled in the art, see, for example, U.S. 2,512,667. The lower members of the series are readily soluble in water and quite sensitive to moisture. The homopolymers which contain longer aliphatic members are water-insoluble and are therefore more applicable to fabrication into films or fibers. Because of our interest in biodegradable materials we tested this latter class of homopolymers for this property and found that, in general, they were inert to tissue degrading mechanisms at least during the first 6 months after implantation.

SUMMARY

We have now discovered a unique class of water-insoluble copolyaminotriazoles which can be formed into physically stable (before implantation) films, molded objects, fibers etc. which are biodegradable within a reasonable period of time (3–6 months). These polyaminotriazoles possess a desirable hydrophobic/hydrophilic balance which permits fabrication and storage stability but possess enough affinity for the body fluids to permit eventual biodegradation. This balance has been found to exist only when the nitrogen content of this specific class of polymers falls within the range of 31.5 to 35.5% by weight. They may be used as films in the topical treatment of burns etc. or as a surgical element during the course of an operation or in the temporary placement of organs.

DESCRIPTION OF THE INVENTION INCLUDING PREFERRED EMBODIMENTS

As mentioned briefly above, we have now found that a certain group of polyaminotriazoles are biodegradable and therefore are especially attractive for use in the medical and agricultural fields.

The novel polymers of our invention have the general formula (I)

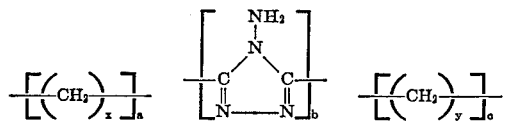

where $x$ is 0–6, inclusive, $y$ is 6–18, inclusive, the nitrogen content of the polymer ranges from about 31.5% to about 35.5%, by weight, based on the total weight of the polymer, the sum of the concentration of $a$ plus $c$ is equal to the concentration of $b$, no $a$, $b$ or $c$ radical is bonded to itself and no $a$ or $c$ radical is bonded to each other.

Our novel polymers are produced by reacting various dihydrazides according to the equation.

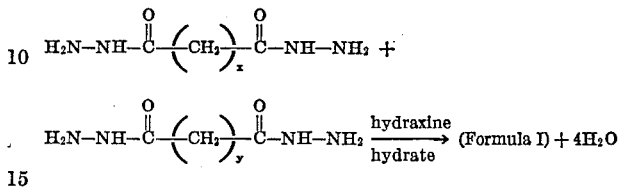

wherein $x$ and $y$ are as set forth above.

The dihydrazides useful in producing our novel polymers are well known in the art and may be produced as set forth in Preparative Methods of Polymer Chemistry, Sorensen et al., Interscience Publishers, 1961, pages 91–92, which publication is hereby incorporated herein by reference.

Examples of suitable dihydrazides which may be reacted according to the above equation to produce our novel polymers include oxalic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, undecanedioic acid dihydrazide, dodecanedioic acid dihydrazide, tridecanedioic acid dihydrazide, tetradecanedioic acid dihydrazide, pentadecanedioic acid dihydrazide, hexadecanedioic acid dihydrazide, heptadecanedioic acid dihydrazide, octadecanedioic acid dihydrazide, nonadecanedioic acid dihydrazide, eicosanedioic acid dihydrazide, and the like.

The reaction is conducted without solvent at a temperature ranging from about 20° C. to about 275° C., preferably from about 235° C. to about 255° C., at atmospheric through superatmospheric pressure of 1000 p.s.i.

The reaction should be allowed to proceed for from about 2 to about 15 hours, preferably from about 5 hours to about 9 hours. After about the first 3 to 6 hours, the pressure is reduced to about 100 p.s.i. primarily for reasons of safety and should not be considered critical to the process. After the reaction is allowed to run its course, the pressure vessel is vented and cooled. The polymers can be taken up in a solvent such as methanol and cast into films.

The following examples are set forth for purposes of illustration only and are not to be construed as limitations on the present invention except as set forth in the appended claims. All parts and percentages are by weight unless otherwise specified.

Evaluation of copolymers

Young female rabbits (2–5 months old) were anesthetized with sodium pentothal. The fur was removed from the abdominal skin which was subsequently treated with "Physohex" and methiolate. Two parallel incisions about ¼ inch long were made 1 inch from each side of the midline of the abdomen. No more than seven pairs of incisions were made in each of four animals in any one series. A channel was produced between the sets of incisions by the use of a series of blunt forceps, such as the Kelly-Murphy variety. The test sample was drawn through the channel by means of one of the above-mentioned forceps. The end of the film strip was secured by suturing the ends of the channel with OO silk.

At the end of the intermediate periods of 45 or 60 days and a terminal testing period of 180 days, the animals were sacrificed and the area of implantation was exposed and examined. No sample could be removed from the fibrotic tissue which had encapsulated or invaded the sample. It seems reasonable to assume that invasion precedes digestion and that invasion is an indication that absorption is more or less likely to occur within some definite period of time, but may be too lengthy to be safe or practical.

On animals, where digestion occurred or was questionable or where no sample could be found, dissections of the liver, kidney and spleen were taken and studied to determine any adverse response to the polymer or its degradation products. None were found.

There was never a sharp distinction between polymer and tissue, and the only way that polymer was observed was by its difference in color. After these samples were fully digested, only a blue-gray scar line (Ghost) was observed. This phenomenon, which also occurs with catgut resorption, is considered so characteristic of cellular response to an absorption process that it forms the basis of our evaluation.

Monomers A and B are reacted under the conditions specified in Table I, below. The pressure is reduced to 100 p.s.i. after 4½ hours and the resultant polymer is recovered in methanol. The results are set forth in the table.

The hydrazine hydrate is employed in order to maintain the reaction in one direction i.e. towards copolymer formation which is necessary due to the by-product water produced.

What is claimed is:

1. A biodegradable film-forming copolymer having the formula

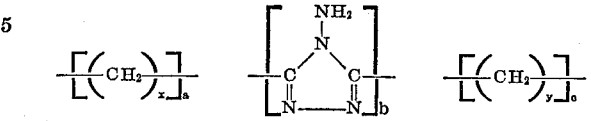

wherein (1) $x$ is a whole, positive integer of 0–6, inclusive, (2) $y$ is a whole, positive integer of 6–18, inclusive (3) the nitrogen content of the polymer ranges from about 31.5% to about 35.5%, by weight, based on the total weight of the polymer, (4) $a+c=b$, (5) no $a$, $b$ or $c$ radical is bonded to itself and (6) no $a$ or $c$ radical is bonded to each other.

2. A copolymer according to claim 1 wherein $x$ is 4 and $y$ is 8.
3. A copolymer according to claim 1 wherein $x$ is 4 and $y$ is 7.
4. A copolymer according to claim 1 wherein $x$ is 3 and $y$ is 7.
5. A copolymer according to claim 1 wherein $x$ is 3 and $y$ is 8.
6. A copolymer according to claim 1 wherein $x$ is 5 and $y$ is 7.
7. A copolymer according to claim 1 wherein $x$ is 6 and $y$ is 7.

TABLE I

| | Hydrazine | | Hydrazine hydrate | Parts | | Temp., °C./pressure, p.s.i./ time, hours | Polymer | | | Biodegradability (180 days) |
|---|---|---|---|---|---|---|---|---|---|---|
| Example | Monomer A | Monomer B | | Monomer A | Monomer B | | Mole percent A | Mole percent B | Total percent N | |
| 1 | Sebacic | Adipec | 30.0 | 36.8 | 20.8 | 250/760/3 260/100/2 | 56.2 | 43.8 | 33.93 | Yes. |
| 2 | do | do | 12.5 | 20.0 | 17.5 | 242/340/6 262/100/3 | 45.2 | 54.8 | 35.21 | Yes. |
| 3C[1] | do | Azeleic | 1.25 | .48 | 4.12 | 260/163/4 275/128/2 | 9.5 | 90.5 | 30.88 | No. |
| 4 | Glutaric | do | 1.25 | .52 | 3.8 | 259/170/3 272+100/2 | 16.3 | 83.7 | 33.38 | Yes. |
| 5C[1] | Subric | Sebacic | 2.5 | 4.38 | 4.79 | 261/365/4 270/100/2½ | 51.0 | 49.0 | 31.30 | No. |
| 6 | Pimelic | Azeleic | 1.25 | 1.18 | 3.19 | 260/190/4 269/118/2 | 30.2 | 69.8 | 32.82 | Yes. |
| 7 | Suberic | do | 1.25 | 1.25 | 3.19 | 258/175/4 267/117/2 | 29.6 | 70.4 | 31.87 | Yes. |
| 8C[1] | Sebacic | do | 1.25 | 1.9 | 2.26 | 263/194/3½ 270/117/2 | 43.7 | 56.3 | 30.10 | No. |
| 9C[1] | Azeleic | do | .60 | 1.72 | | 243/80/4 255/40/2 | 50.0 | 50.0 | 31.08 | No. |
| 10 | do | Adipic | .35 | .60 | .35 | 238/70/4 250/40/2 | 57.4 | 42.6 | 35.10 | Yes. |
| 11 | Glutaric | Sebacic | 2.5 | 2.05 | 6.76 | 263/250/3½ 270/110/2 | 32.7 | 67.3 | 34.13 | Yes. |
| 12C[1] | Malonic | Azeleic | 1.25 | .48 | 3.81 | 260/168/3 271/120/2 | 18.5 | 81.5 | 36.12 | (²) |
| 13C[1] | Sebacic | Sebacic | 5.0 | 20.0 | | 260/540/3½ 270/100/2 | 50.0 | 50.0 | 28.80 | No. |

[1] C=Comparative.  ² Too water-soluble to ascertain.

References Cited

UNITED STATES PATENTS 2,512,667  6/1950  Moncrieff _____ 260—2
2,512,601  6/1950  Bates et al. _____ 260—78.4

JOSEPH L. SCHOFER, Primary Examiner

J. KIGHT, Assistant Examiner

U.S. Cl. X.R.

260—78 R, 78.4 R; 260—Dig. 43